3,062,182
RECLAMATION OF OYSTER GROUND
John L. Wiegardt, Jr., Box 236, Ocean Park, Wash.
No Drawing. Filed June 30, 1960, Ser. No. 39,833
4 Claims. (Cl. 119—4)

This invention relates to the reclamation of oyster ground. It has been my observation that in order for oysters to be profitably fattened, it is necessary that the ground on which they lay be covered by a substantial layer of silt. The silt performs two functions, that of (1) localizing the underlying sand so that currents occasioned by wind and tides will not shift the sand so as to bury the young oysters, and (2) storing food substance for fattening the oysters. It has been further observed that the degree to which silt is lost and sand becomes bared is in direct proportion to infestation of the concerned ground by burrowing shrimp. Moreover, ground which has been infested by shrimp becomes "soured" by semi-toxic pollutants.

The present invention aims to provide a method of cultivating overworked, marginal, and sub-marginal oyster ground so as to reclaim and return the same to high productivity. The invention essentially lies in so working the ground as to destroy the shrimp burrows and bring the shrimp to the surface. On ground from which the water has receded by an ebbing tide the surfaced shrimp are quickly eliminated by sea-gulls or, if desired, the same can be collected and otherwise destroyed. The ground is worked by first rolling the area to firm it up. This is accomplished by conventional rollers drawn behind "cat" tractors, the preferred procedure being to employ two or more rollers in a staggered pattern. After such rolling the "firmed" ground is plowed and for this purpose I prefer to employ a John Deere "Killefer" pan-breaker or sub-soiler, a tool that has a single shaft and foot that penetrates to a depth of approximately two feet. Such sub-soiler, pulled by a tractor, is caused to produce furrows at intervals of approximately two feet. The plowed ground is then again rolled. All of these steps are performed on bared ground between tides.

To point up significant accomplishments of the invention, it is of interest to note findings of the State of Washington Shellfish Laboratory in respect of oyster crops tested on eight similar tracts. One of these tracts was subjected to cultivation in accordance with the present process. Reporting monthly on growth and general condition, between March and April the oysters planted on the treated ground developed from a rating of 7.3 to 10.1 on the following scale:

Under 8—non-commercial
8/10—fair
10/12—good
Over 12—excellent

The untreated areas, by comparison, showed the following results:

2—8.2 to 9.0
3—7.0 to 8.0
4—5.0 to 6.3
5—10.5 to 10.4
6—8.6 to 9.0
7—8.8 to 9.4
8—10.0 to 10.2

It is of moment to note that young oysters planted on treated ground evidence a marked shell growth. Rapid shell growth at an early age is desirable from the fact that oysters fatten after having attained a good shell size.

It is quite possible that high-pressure jets, or a powerful suction action, could serve to penetrate and destroy shrimp burrows on non-used oyster ground while the same is under water. The few jet and suction tests which I have so far conducted have been insufficient to develop conclusive data and feasability of underwater treatment.

It is believed that the invention will have been clearly understood from the foregoing detailed description of the process. It is my intention that no limitations be implied and that the hereto annexed claims be given the broadest interpretation to which the employed language fairly admits.

What I claim, is:

1. The method of reclaiming oyster ground which has become infested with burrowing shrimp, the method being performed while the ground is bared by an ebbing tide, comprising first firming the ground by rolling, then plowing the ground to a substantial depth, and again firming by rolling.

2. The method of reclaiming oyster ground which has become infested with burrowing shrimp, comprising first firming the ground by rolling, then plowing the ground to a substantial depth, and again firming by rolling.

3. The method of reclaiming oyster ground which has become infested with burrowing shrimp, the method being performed while the ground is bared by an ebbing tide, comprising first firming the ground by rolling and then plowing to a depth of approximately two feet with the plow furrows being at no more than two-foot intervals.

4. The method of treating tide lands which have become infested with burrowing shrimp, preparatory to planting oysters, comprising turning up the ground to a substantial depth to break up the burrows and bring the shrimp to the surface, performed while the lands are bared so that sea gulls will eliminate the exposed shrimp, and rolling the ground following said turning of the ground.

References Cited in the file of this patent

UNITED STATES PATENTS

| | | |
|---|---|---|
| 1,517,086 | Mattice | Nov. 25, 1924 |
| 2,269,724 | Linkogel | Jan. 13, 1942 |